No. 638,238. Patented Dec. 5, 1899.
J. A. & A. M. HALEY.
MACHINE FOR TRIMMING FAT FROM SKINS.
(Application filed May 22, 1899.)
(No Model.) 2 Sheets—Sheet 1.

WITNESSES
INVENTORS

No. 638,238. Patented Dec. 5, 1899.
J. A. & A. M. HALEY.
MACHINE FOR TRIMMING FAT FROM SKINS.
(Application filed May 22, 1899.)
(No Model.) 2 Sheets—Sheet 2.
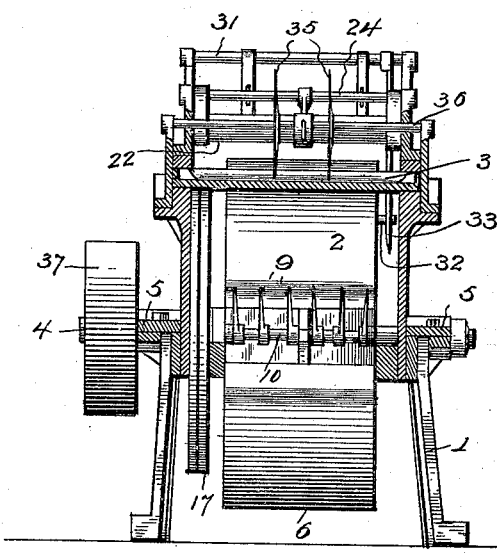
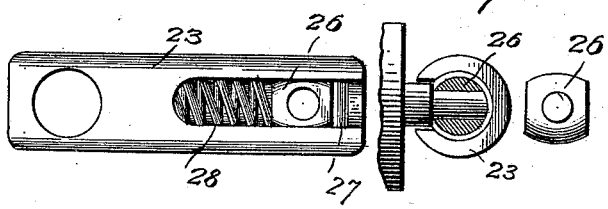
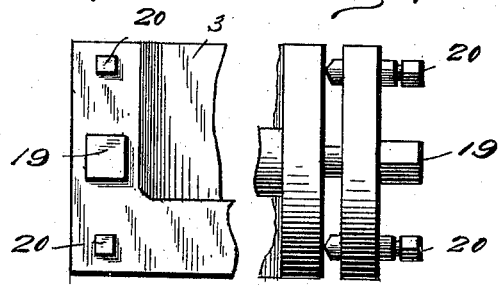
WITNESSES
INVENTORS
THE NORRIS PETERS CO., PHOTO-LITHO., WASHINGTON, D. C.

UNITED STATES PATENT OFFICE.

JOSEPH A. HALEY AND ANDREW M. HALEY, OF SIOUX CITY, IOWA.

MACHINE FOR TRIMMING FAT FROM SKINS.

SPECIFICATION forming part of Letters Patent No. 638,238, dated December 5, 1899.

Application filed May 22, 1899. Serial No. 717,745. (No model.)

*To all whom it may concern:*

Be it known that we, JOSEPH A. HALEY and ANDREW M. HALEY, citizens of the United States, residing at Sioux City, in the county of Woodbury and State of Iowa, have invented certain new and useful Improvements in Machines for Trimming Fat from Skins; and we do hereby declare the following to be a full, clear, and exact description of the invention, such as will enable others skilled in the art to which it appertains to make and use the same.

Our invention relates to improvements in machines for trimming fat or other flesh from skins.

It consists in a machine having a cylinder provided with suitable gripping mechanism for engaging the skin to be divested of its fat, means for rotating the cylinder, and a stationary knife against which the fat or flesh of the skin is forced to strip it therefrom, and means for operating the grippers.

It also consists in a machine having a cylinder provided with a series of grippers for engaging the skin to be divested of its fat, cams for engaging the said grippers and causing them to grip or release the said skin, a stationary knife for stripping the fat from the skin, and vertical knives for cutting the fat into proper-sized strips.

It further consists in certain other novel constructions, combinations, and arrangements of parts, as will be hereinafter described and claimed.

Figure 1:
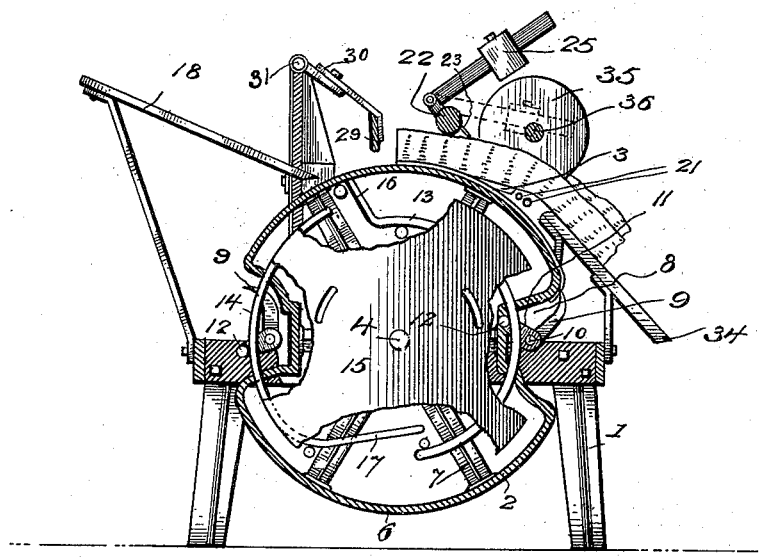
Figure 2:
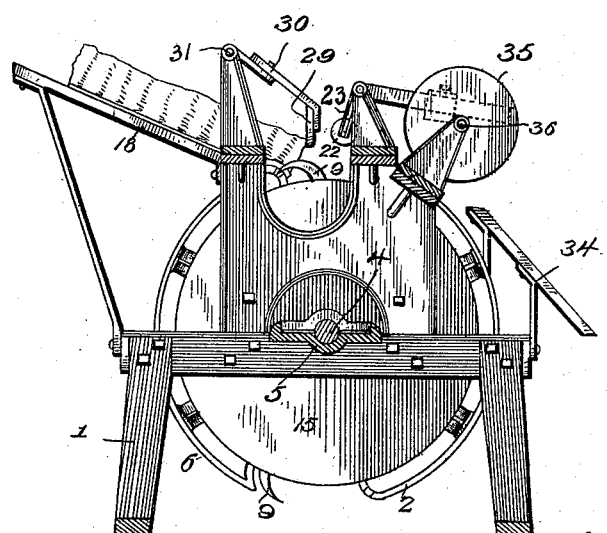
Figure 8:
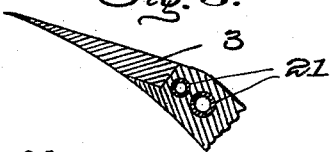

In the accompanying drawings, Figure 1 represents a vertical longitudinal section through our improved machine for stripping fat from skins. Fig. 2 represents a side elevation of the same; Fig. 3, a vertical transverse section through the said machine, the gripping-cylinder being shown in elevation. Fig. 4 represents a detail side elevation of one of the arms supporting a pressure-roller. Fig. 5 represents a detail view illustrating the manner of journaling the said pressure-roller in the said arm. Fig. 6 represents a detail view of one end of the stationary knife; and Fig. 7 represents a detail end elevation of the same, illustrating the manner of adjusting the knife. Fig. 8 is an enlarged detail sectional view of a stationary knife, showing the manner of heating the same.

Our invention is designed to strip the fat or other flesh from skins and to cut the fat or flesh thus removed from the skins into suitable pieces for further use.

1 in the drawings represents the frame of our improved skinning-machine, 2 a cylinder mounted therein, and 3 a stationary knife.

The cylinder 2 is mounted upon a suitable power-shaft, as 4, which is supported in bearings 5 5 on the frame 1. The cylinder 2 is preferably formed of a broad peripheral portion, as 6, held in place by a suitable spider, as 7, which rotates with the said shaft 4. The cylinder 2 is provided with depressed portions upon its periphery, as at 8, in which a series of grippers 9 are mounted. The grippers 9 are secured to a shaft 10, suitably pivoted in the recess 8. Upon the same side of the machine each of the shafts 10 is provided at its end with an actuating-arm 11, which has a projection 12 for operating the said arm. In order to operate the grippers 10, two cams, as 13 and 14, are secured to the inner face of a plate 15 upon one side of the frame 1. The cam 13 is provided with an end portion 16, which is bent outwardly to a point about opposite the inner surface of the periphery of the cylinder 2. This bent-out portion 16 engages the projections 12 on the arms 11 and guides them to the curved surface of the cam 13, thus bringing the grippers against the cylinder 2 in such a manner as to grip the skins to be operated upon, as clearly seen in Figs. 1 and 2 of the drawings. The cam 14 is provided with an inwardly-bent portion, as 17, which receives the projections 12 after they pass from the cam 13 and guides them to the outer curved portion of the said cam 14. This actuates the grippers in the opposite direction and releases the skins at the proper time. It is preferable to employ a number of gripping-arms 9 upon each of the shafts 10, as seen in Fig. 3 of the drawings, in order that the skin may be thoroughly gripped.

In order to feed the skin and its flesh or fat to the cylinder, a suitable feeding-platform, as 18, is mounted upon the frame 1 to one side of the cylinder. A stationary knife, as 3, is mounted in proper position with reference to the cylinder 2 to trim the flesh from a skin passing between it and the periphery of the said cylinder. This knife 3 is secured to the frame 1 at its ends by means of bolts or screws 19, and the knife is adapted to be adjusted with respect to the cylinder by means of set-screws 20 20 at each end thereof, as seen in Fig. 7 of the drawings. The knife is preferably provided with heating-passages, as 21, which extend along near the rear edge of the knife 3. By means of these heating-passages the knife can be kept warm, so as to more easily cleave the fat from the skin.

In order to hold the flesh and skin to be operated upon against the cylinder 2, we employ a pressure-roller, as 22, which is journaled at its ends in the arms 23, secured to a shaft 24, which is journaled in the frame 1. The said roller is held in contact with the flesh by means of a weighted arm or lever, as 25. In order to permit the pressure-roller 22 to adjust itself with relation to the thickness of the flesh passing beneath it, the ends of the said roller are journaled in movable journal-blocks 26, which slide in recesses in the lower ends of the arms 23. They are prevented from passing out of the said recesses by means of a cross-piece 27. (Seen in Fig. 4 of the drawings.) These journal-blocks are preferably forced downwardly by the action of springs 28, which are interposed behind them in the recesses of the arms 23.

In order to stop the skin temporarily and permit the grippers to get a firm hold of the same, we provide an automatically-operated stop-bar 29, which is carried by arms 30, secured to a cross-shaft 31. When the stop-bar is in its lower position, it will impede the progress of the skin and flesh, as seen in Fig. 2 of the drawings. As soon as the grippers have engaged the said skin a projection 32 on the cylinder 2 engages an arm 33, secured to the shaft 31, and thereby raises the stop-bar out of its position in front of the skin. After being separated by the knife from the skin the flesh or fat passes upon a second platform 34, which will direct it to any suitable point. In order to cut the said fat into desirable strips, we mount disk knives, as 35 35, upon a shaft 36, just above and a little to the rear of the stationary knife, so that as the fat or flesh passes over the knife the disk knives 35 will divide it into the desired strips.

The power-shaft 4 is adapted to be driven by a power wheel or pulley 37, secured to one end thereof and connected up with any suitable source of power.

The operation of the machine is as follows: The skin, with its flesh, is placed upon the platform 18, and the cylinder 2 is caused to revolve. The skin will be moved down upon the platform as far as the stop-bar 29 will permit. As the cylinder revolves one set of grippers 9 will operate the cam 13, and when they reach the said cam will be caused to grip the skin against the periphery of the cylinder 2. The stop-bar 29 will then be automatically operated to admit the skin and flesh to pass on. The skin will be carried beneath the knife by the cylinder, while the knife will separate all fat or flesh from the skin and pass it to the disk knives 35 and the platform 34, the pressure-roller 32 holding the material in proper position with relation to the cylinder. After the cylinder has made half a revolution the grippers will engage the cam 14 and be caused to release the skin, which will drop from the cylinder 2. As illustrated in the drawings, we prefer to have two sets of grippers 9, one of which is holding a skin to the cylinder, while the other is idle. The disk knives will cut the fat or flesh into strips of a suitable size for further grinding or manipulation as may be desired.

It will be seen that our invention is particularly well adapted for grasping skins and cleaving all fat or flesh from the same, and though effective is exceedingly simple in construction.

Having now described our invention, what we claim as new, and desire to secure by Letters Patent, is—

1. In a machine for stripping fat from skins, the combination with a suitable frame, of a revoluble cylinder mounted therein, pivoted gripping-arms secured to said cylinder adapted to automatically grip skins fed into the machine, and a stationary knife against which the fat upon the skin is forced to sever it therefrom, substantially as described.

2. In a machine for stripping skins of fat, the combination with a suitable frame, of a revoluble cylinder mounted therein, said cylinder having depressions upon its periphery, pivoted gripping-arms mounted therein, adapted to automatically grip skins fed into the machine, arms secured to the shafts of said gripping-arms and having actuating projections, and cam-paths mounted upon the frame of the machine for engaging the said projections, whereby the grippers will be caused to grip or release the skin to be acted upon, substantially as described.

3. In a machine for stripping fat from skins, the combination with a suitable frame, of a revoluble cylinder mounted therein, a pivoted shaft carrying grippers, the said grippers being adapted to automatically grip skins fed to the machine, a cam for forcing the shafts with its grippers into their gripping position, and a cam for moving them into the opposite direction to release the skins, substantially as described.

4. In a machine for stripping fat from skins, the combination of a cylinder having depressed portions in its periphery, shafts mounted in the said depressed portions and carrying a series of gripping arms or hooks, and cams for rocking the said shafts, whereby the gripping-arms may be thrown back in the recesses out of engagement or may be brought forward automatically to grip a new skin, substantially as described.

5. In a machine for stripping fat and flesh from skins, the combination with a suitable cylinder, of means for gripping the skins thereof, a stationary knife for engaging the flesh on the skins, and means for heating the said knife, whereby it will cut the fat or flesh more easily, substantially as described.

6. In a machine for stripping fat or flesh from skins, the combination with a revoluble cylinder, of means for attaching the skins thereto, a stop-bar for holding the said skin in proper position to be gripped, and means upon the cylinder for automatically removing the said stop-bar after the skin has been properly gripped, substantially as described.

7. In a machine for stripping the fat or flesh from skins, the combination with a cylinder for carrying skins forward in the machine, a stationary knife for stripping fat or flesh from the skins, and disk knives for cutting the said fat into suitable strips, substantially as described.

8. In a machine for stripping fat or flesh from skins, the combination with a suitable cylinder for gripping the skins and a stationary knife for cutting the flesh or fat therefrom, a pressure-roller for holding the skins against the cylinder, said roller being journaled in movable journal-blocks, arms for supporting the said journal-blocks, and springs interposed between the said arms, and journal-blocks for holding them normally in their lower position, the construction being such that the roller may adapt itself to any unevenness in the fat or flesh passing under it, substantially as described.

In testimony whereof we hereunto affix our signatures in presence of two witnesses.

JOSEPH A. HALEY,
ANDREW M. HALEY.

Witnesses:
JOHN PEIRCE,
MARIS PEIRCE.